United States Patent
Olson et al.

(10) Patent No.: US 8,448,679 B2
(45) Date of Patent: May 28, 2013

(54) WATER TREATMENT DEVICE FOR PRODUCING BOTTLED WATER

(75) Inventors: Judd D. Olson, Deephaven, MN (US); Sean C. McGreevy, St. Paul, MN (US); Kent E. Lageson, Burnsville, MN (US); Kevin E. Kinzer, Forest Lake, MN (US); Paul J. Cobian, Woodbury, MN (US); Benjamin P. Williams, St. Joseph, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 734 days.

(21) Appl. No.: 12/572,469

(22) Filed: Oct. 2, 2009

(65) Prior Publication Data

US 2011/0079317 A1 Apr. 7, 2011

(51) Int. Cl.
*B65B 1/04* (2006.01)

(52) U.S. Cl.
USPC ............ 141/353; 141/18; 141/237; 141/333; 222/189.06; 210/513

(58) Field of Classification Search
USPC ................... 141/351, 353–356, 360, 341, 18, 141/234, 236, 237, 239, 247, 248, 286, 297, 141/298, 309, 331, 333, 335, 338, 344, 345, 141/349, 365, 198; 222/190, 189.06; 210/513
See application file for complete search history.

(56) References Cited

U.S. PATENT DOCUMENTS

| 717,720 | A | * | 1/1903 | Schofield ................... 141/82 |
| 3,561,506 | A | * | 2/1971 | Johnson ................... 141/360 |
| 5,225,078 | A |  | 7/1993 | Polasky et al. |
| 5,240,620 | A |  | 8/1993 | Shalev |
| 5,381,839 | A | * | 1/1995 | Dowd ................... 141/242 |
| 5,665,224 | A |  | 9/1997 | Levene |
| 5,699,719 | A | * | 12/1997 | Lucas et al. ................... 99/299 |
| 6,569,329 | B1 |  | 5/2003 | Nohren, Jr. |
| 6,641,719 | B1 |  | 11/2003 | Naito |
| 7,427,355 | B2 |  | 9/2008 | Chan |
| 2006/0249442 | A1 |  | 11/2006 | Yap et al. |
| 2008/0121583 | A1 |  | 5/2008 | Nohren |

FOREIGN PATENT DOCUMENTS

EP 0655938 B1 12/1996

OTHER PUBLICATIONS

International Search Report for PCT/US2010/051044 prepared by the Korean Intellectual Property Office, mailed Jun. 30, 2011.

* cited by examiner

*Primary Examiner* — Jason K Niesz
(74) *Attorney, Agent, or Firm* — David B. Patchett (57) ABSTRACT

A water treatment device for filling at least one bottle with treated tap water includes a housing unit having a reservoir, and at least one valve arranged in fluid communication with the reservoir, the valve having a water inlet/air exit port arranged adjacent to the housing unit, and a water exit/air inlet port arranged opposite the water inlet/air exit port, whereby when the valve is actuated to its open condition, water flows through the valve and into the bottle, and air entrapped in the bottle flows through the valve and into the surrounding environment. When the valve is in its closed condition, air and water do not flow through the valve.

8 Claims, 10 Drawing Sheets

WATER TREATMENT DEVICE FOR PRODUCING BOTTLED WATER

BACKGROUND

The present disclosure relates generally to water treatment and, more particularly, to a water treatment device for filling at least one bottle with treated tap water.

Oftentimes, municipal tap water has a taste or odor that people find objectionable. Individuals seeking improved drinking water quality may choose to either filter the tap water or purchase bottled water.

Gravity-fed and pressure-fed water filtration devices for filtering domestic tap water are known in the patent art. U.S. Pat. No. 5,225,078 (Polasky, et. al.), for example, discloses a pour-through pitcher filter assembly including a compact filter element including a thin annular disk of molded activated carbon and a peripheral annular seal element. U.S. Patent Application Publication No. 2006/024/0249442 (Yap, et. al.) discloses a portable water container including a body defining a reservoir, a replaceable filter housed in a storage compartment of the body, and a connection assembly. The connection assembly connects a water supply source to the filter. Pressurized water from the water supply source flows under pressure through the filter and into the water reservoir through an outlet port in the storage compartment People may also choose to drink bottled water for reasons such as better taste, perceived health benefits, and convenience. Attempts have been made to filter domestic water for water bottles. U.S. Pat. No. 6,641,719 (Naito), for example, discloses a water purifier for use with bottle containers that is capable of being installed on a bottle container such as a PET bottle and is capable of purifying water. U.S. Pat. No. 7,427,355 (Chau) discloses a water treatment unit for positioning in a sport bottle or container for treating water.

SUMMARY

Gravity-fed water filtration devices are generally slow filling, and pressure-fed devices must be repeatedly connected to and disconnected from a water source, which generally requires that the device and water source have matching fittings. In addition, because of the size and location of the filter, only about one-half of the container volume is typically usable within such devices to hold filtered water. That is, the filter occupies a significant volume of the vessel, thereby limiting the storage capacity of such devices. Such water pitchers also lack the convenience and portability of a water bottle. Bottled water is more expensive than drinking water from municipal sources, takes energy and resources to produce, package, transport, and store, and produces a large volume of plastic waste that must be properly disposed. The need exists for a water treatment device that can treat, for example, domestic tap water to make bottled water, and overcomes the above identified limitations.

The present invention provides a water treatment device for filling at least one bottle with, for example, treated tap water. The device generally includes a housing unit having a reservoir, and at least one valve arranged in fluid communication with the reservoir. The valve includes a water inlet/air exit port arranged adjacent to the housing unit, and a water exit/air inlet port arranged opposite the water inlet/air exit port. When the valve is actuated to its open condition, water is able to flow through the valve and into the bottle, and air entrapped in the bottle is able to flow through the valve and into the surrounding environment. When the valve is in its closed condition, air and water are not able to flow through the valve.

In one aspect, the housing unit may comprise a stand. The stand may include a base portion, and may include a support portion extending from the base to the bottom of the housing unit. The bottle may be configured to actuate the valve to its open condition when the top of the bottle engages the valve and the bottom of the bottle engages the base portion of the stand.

The base may include an inclined surface angled upwardly in the direction of the support portion, whereby when the top of a bottle is placed into contact with a valve and the bottom of the bottle is urged upwardly along the inclined surface, the top of the bottle serves to actuate the valve from its closed condition to its open condition, thereby allowing treated water to flow into the bottle, and allowing air entrapped in the bottle to be released. The inclined surface may include a protrusion arranged to retain a bottle in an installed position between the base portion and a corresponding valve actuated to its open condition.

In a specific embodiment, the valve may include a valve member that extends downwardly from the housing unit, a sleeve member arranged around the valve member and movable to engage the valve member, and a biasing member arranged to urge the sleeve member into contact with the valve member. The valve member may include a sealing portion, and the sleeve member may contain a flow channel.

In various aspects, the valve member may remain in a generally fixed position relative to the housing unit, and the sleeve member may be slidably arranged around the valve member. The sleeve member may include a first end opposite the biasing member containing the water exit/air inlet port. The sleeve member may include an outer sealing surface extending from the water exit/air inlet port toward the housing unit. The sealing portion of the valve member may be arranged to selectively shut the water exit/air inlet port.

In one embodiment, the outer sealing surface of the sleeve member may include a frustoconical surface and a radially outwardly extending shoulder surface. In a more specific embodiment, the outer sealing surface may be elastomeric. In one aspect, the sealing surface may form a hermetic seal with an opening of the bottle, thereby forming a closed system that prevents overflow of water from the bottle during filling and minimizes spillage of water from the valve when the bottle is removed from the device.

In one aspect, the valve is movable between a non-actuated closed condition and an actuated open condition, and the valve is actuated to its open condition when a bottle is properly installed in the device.

In one aspect, the device may be portable (i.e. small enough in size and light enough in weight so that a user can readily transport it from one location to another). In another aspect, the device is freestanding (i.e. it is not plumbed or permanently installed at one location).

In another aspect, the device may include a plurality of valves. The device may fill a single bottle at a time or may fill a plurality of bottles simultaneously. In a specific embodiment, the device includes four valve and four associated bottles.

In another specific embodiment, the water inlet/air exit port define an orifice, and the orifice may have a cross sectional area of at least about 1 cm$^2$, and may have a cross sectional area of no greater than about 2 cm$^2$. In another specific embodiment, the valve may include at least one air flow passageway and at least one water flow passageway. In one embodiment, the air flow passageway extends beyond the orifice and beyond the water flow inlet port, thereby to promote the flow of air through the air flow passageway and water through the water flow passageway, respectively. In other aspects, the housing unit may include a bottom wall and a side wall, and the bottom wall of the reservoir may contain the orifice. In a specific aspect, the reservoir bottom surface is substantially planar.

In another aspect, the device may further comprise a replaceable treatment cartridge removably arranged within the reservoir. The replaceable treatment cartridge may have a conical bottom surface that is angled downwardly from the housing side wall to the housing unit bottom surface, thereby to direct the flow of treated water radially inwardly and downwardly toward a centrally located drain opening, and to direct the flow of entrapped air from the bottle radially outwardly and upwardly along the bottom of the housing unit.

The another aspect, the housing unit may comprise a lid arranged to enclose the reservoir. In another aspect, the device may include a drain valve arranged in fluid communication with the reservoir.

In another aspect, the present invention provides a gravity-fed freestanding water treatment system that includes the combination of the above described housing assembly, water treatment cartridge, and at least one bottle.

An advantage of certain embodiments of the water treatment device include that it is easy to use, provides for rapid treatment of untreated water, is portable, and produces bottled water directly (i.e. without transferring the treated water from a holding chamber to a bottle).

BRIEF DESCRIPTION OF THE DRAWINGS

The present invention will be further described with reference to the accompanying drawings, in which:

FIG. 8b is a cross-sectional view taken along line 8b-8b of FIG. 8a.

DETAILED DESCRIPTION

Figure 1:
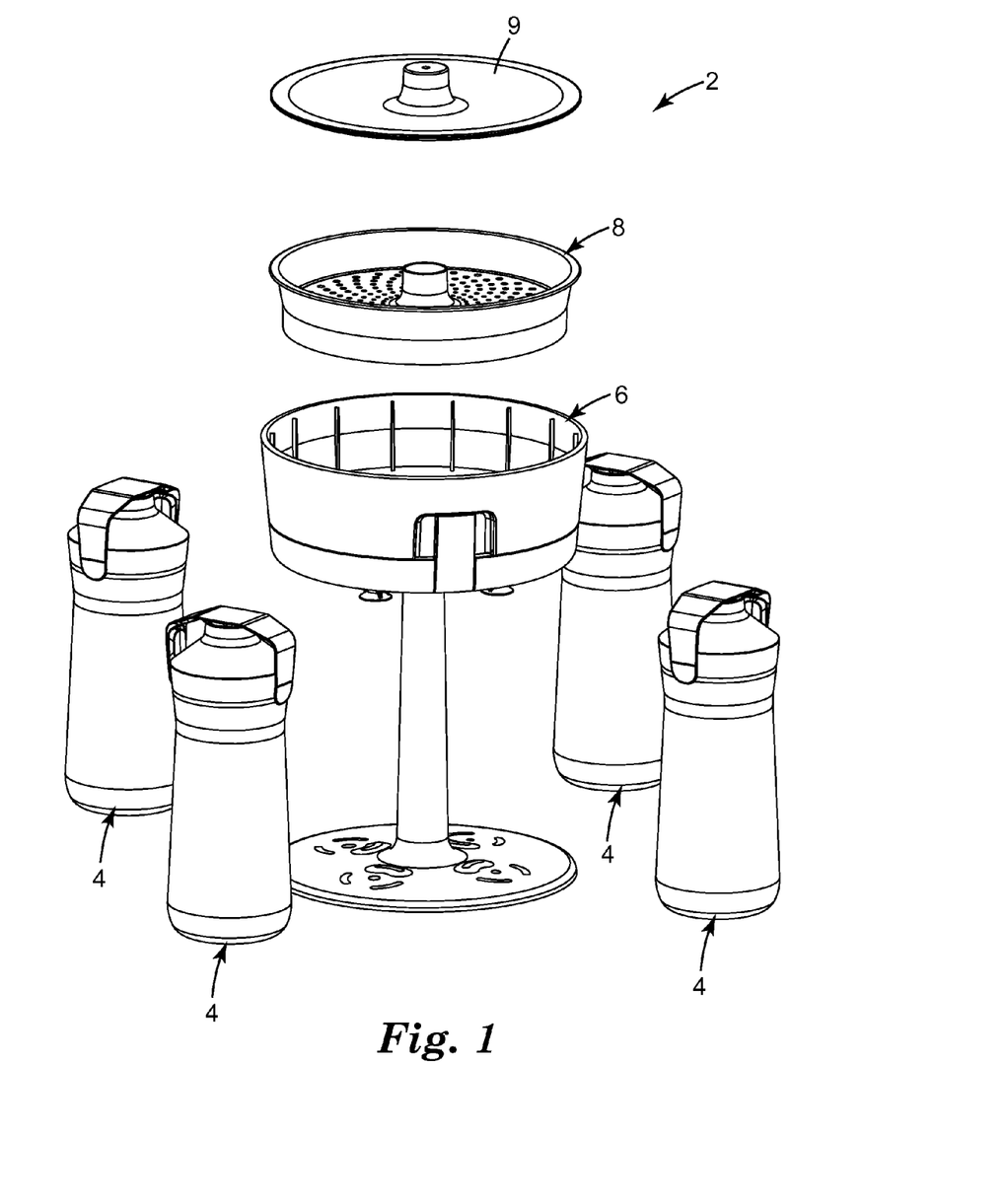
FIG. 1 is an exploded perspective view of a water treatment system according to the invention.

Referring now to the drawings, wherein like reference numerals refer to like or corresponding parts throughout the several views, FIG. 1 generally shows the components of a water treatment device 2 for filling one or more bottles 4 with, for example, treated water. In one aspect, the device 2 may be freestanding and portable. That is, the device 2 is not plumbed, or connected directly to a water source, and is not mounted or installed at a particular location. Rather, the device 2 may be readily moved from one location to another. In another aspect, the device 2 may be gravity-fed. That is, the unfiltered water is not pressurized and is allowed to flow freely through the device under the force of gravity. The device 2 typically has a relatively small size (e.g. less than approximately 1 cubic foot), which allows the device 2 to be placed on a countertop or in a refrigerator without consuming too much space, and has an overall height that allows the device 2 to be positioned under a faucet in, for example, a kitchen sink (e.g. less than 1 foot (30 centimeters) high), whereby tap water can be directed into the device 2 from the faucet. It is also desirable that the device 2 be lightweight (e.g. less than 12 pounds when full of water) to facilitate portability.

The device 2 includes a housing assembly 6, a treatment cartridge 8 removably arranged within the housing assembly 6, and an optional lid 9 removably arranged on the top of the housing assembly 6. In the illustrated embodiment, the device 2 is designed for use with up to four bottles at one time. The present disclosure, however, contemplates devices that may be designed for use with as few as one bottle, or designed for use with more than four bottles (e.g. 8, 12, or more).

Figure 2:
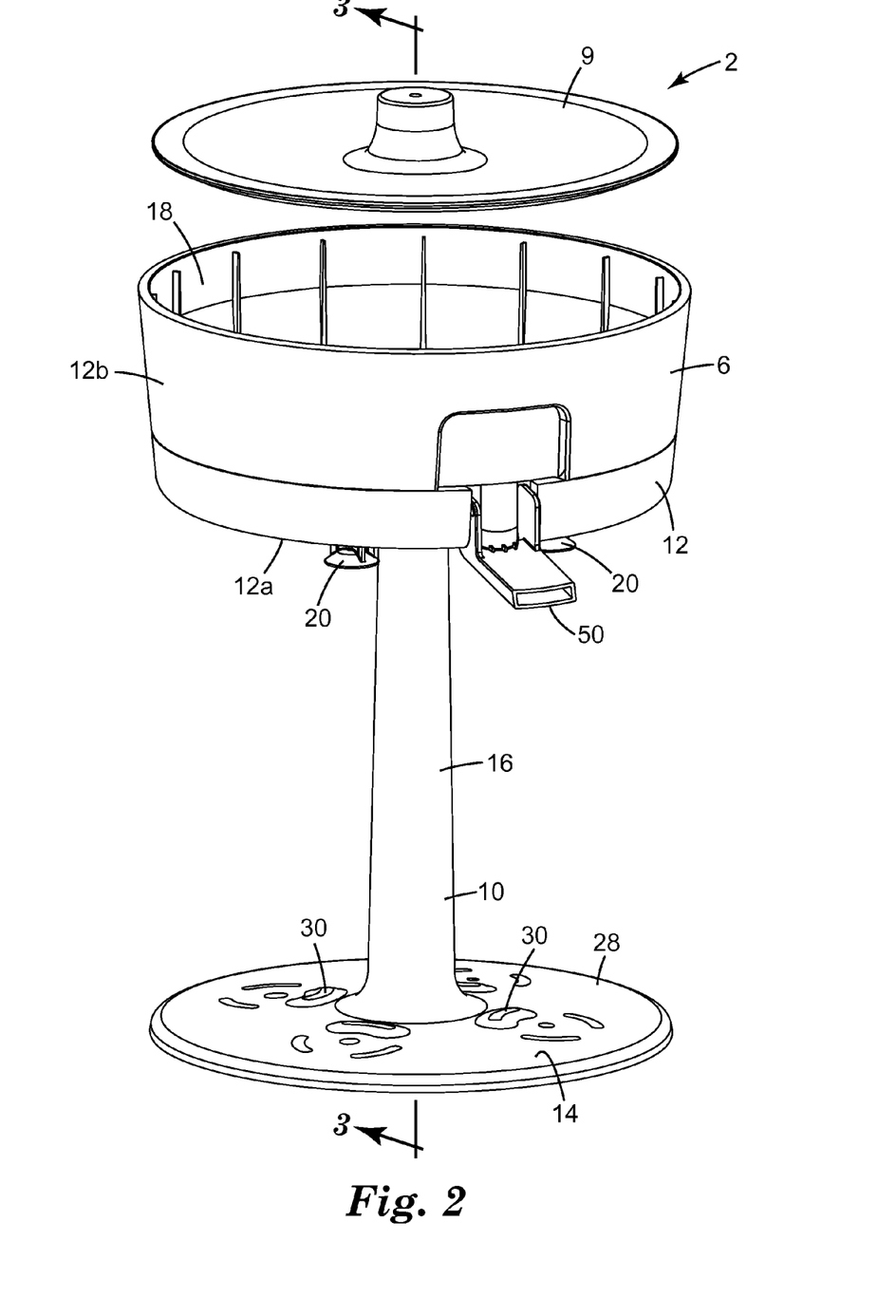
FIG. 2 is a perspective view of the housing assembly with the lid removed.
Figure 3:
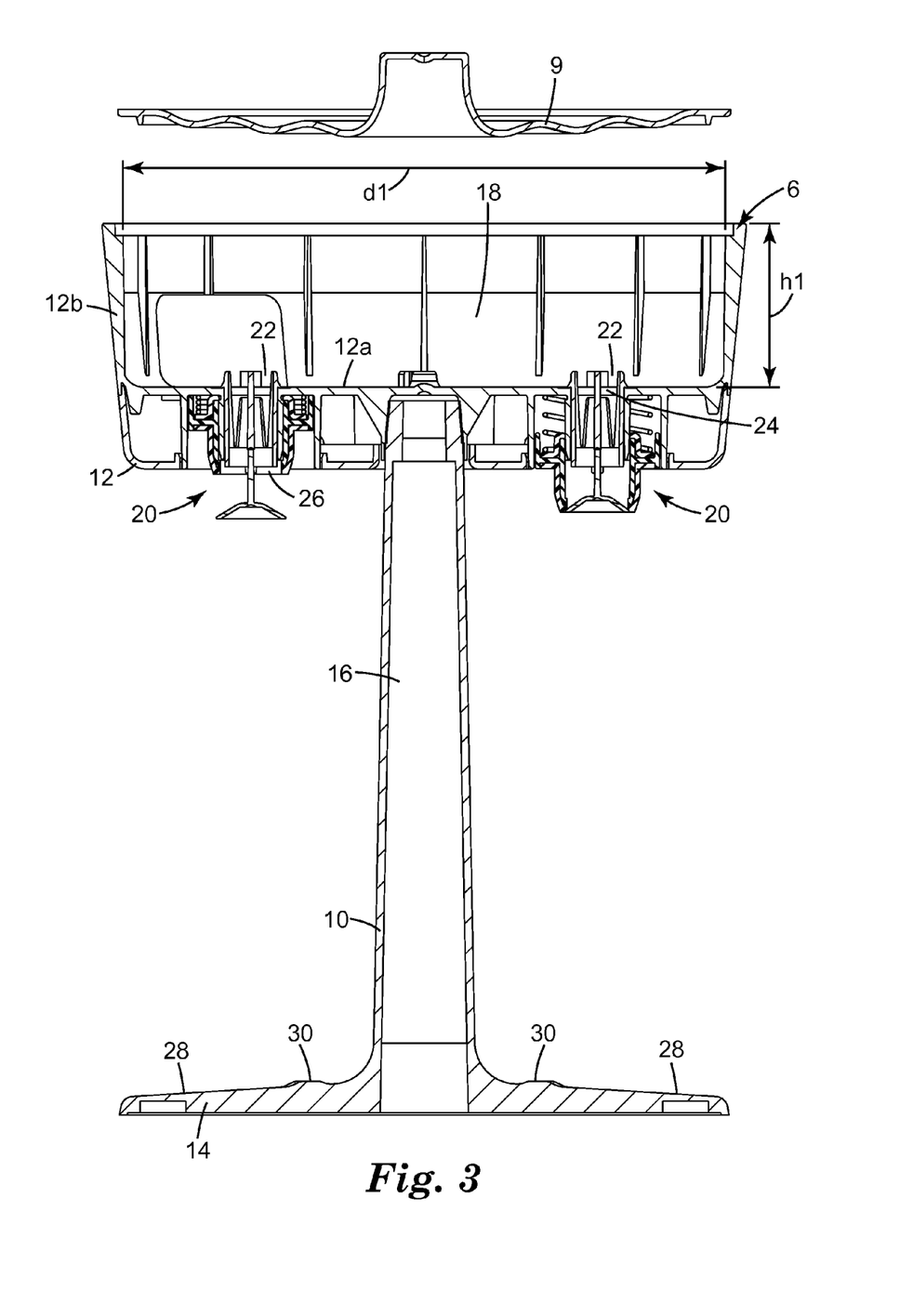
FIG. 3 is a cross-sectional view taken along line 3-3 of FIG. 2.

Referring now to FIGS. 2 and 3, there is shown an exemplary housing assembly 6. In the illustrated embodiment, the housing assembly 6 includes a stand 10 and a housing unit 12 supported by the stand 10. The stand 10 includes a base 14 and a support member 16 extending upwardly from the base 14 to the housing unit 12. The base 14 has a generally circular footprint, which has a sufficiently large surface area so the device 2 is not prone to tipping. Bases 14 having other sizes and shapes may also be used.

The support member 16 is generally cylindrical and has a height that allows one or more bottles 4 to be positioned between the base 14 and the housing unit 12, as described in more detail below.

The housing unit 12 is arranged on the upper end of the support member 16 opposite the base 14. In the illustrated embodiment, the housing unit 12 is generally bowl-shaped, and includes a generally planar circular bottom wall portion 12a, and an annular side wall portion 12b that extends upwardly from the peripheral edge of the bottom wall portion 12a. The bottom wall portion 12a and side wall portion 12b combine to define a water treatment reservoir 18. The bottom wall portion 12a of the housing unit 12 is generally planar, but may be contoured or sloped to control water flow.

The reservoir 18 may have a diameter "$d_1$" of at least about 6 centimeters (cm), at least about 8 cm, at least about 10 cm, or at least about 12 cm, a diameter "$d_1$" of no greater than about 30 cm, no greater than about 25 cm, or no greater than about 20 cm, and a depth "$h_1$" of less than about 10 cm, less than about 8 cm, or less than about 6 cm. The reservoir 18 may have a volume of less than about 2 liters, less than about 1.75 liters, or less than about 1.5 liters. In the illustrated embodiment, the housing unit 12 and reservoir 18 have generally cylindrical shapes, but housing units and reservoirs having other sizes and shapes are contemplated in connection with the present disclosure.

In the illustrated embodiment, a plurality of valves 20 are arranged in fluid communication with the water treatment reservoir 18, thereby to allow treated water to selectively exit the water treatment reservoir 18. For illustrative purposes, in FIG. 3 one valve (i.e. the valve on the left side of FIG. 3) is shown in its actuated or open condition, and one valve (i.e. the one on the right side of FIG. 3) is shown in its non-actuated closed condition.

Water may exit through all valves 20 simultaneously, or through any one of the valves 20 individually. Each valve 20 includes a water inlet/air exit port 22 that opens to the reservoir 18. The water inlet/air exit port 22 defines an orifice 24 in the bottom wall 12a of the housing unit 12. Each valve 20 further includes a water exit/air inlet port 26 opposite the water inlet/air exit port 22 for fluid communication with an associated bottle 4. In a specific embodiment, the water inlet/ air exit port 22 defines an orifice 24 having a cross sectional area of at least about 1 cm², and a cross sectional area of no greater than about 2 cm².

Each valve 20 is operable between an unactuated condition as shown in the right hand side of FIG. 3, and an actuated open condition, as shown on the left hand side of FIG. 3. In the closed condition, air and water are not able to flow through the valve 20. In the open condition, water is free to flow downwardly from the water treatment reservoir 18 through the water inlet/air exit port 22, through the valve 20, out the water exit/air inlet port 26, and into an associated bottle 4, and air entrapped in the associated bottle 4 is free to simultaneously flow upwardly through the water exit/air inlet port 26, through the valve 20, out the water inlet/air exit port 22, and into the surrounding environment.

In accordance with one characterizing aspect of the device 2, the base 14 includes an inclined cam surface 28 angled upwardly in the direction of the support member 16. The inclined cam surface 28 serves to gradually urge a bottle 4 upwardly against an associated valve 20 as the bottom of the bottle 4 is slid along the inclined cam surface 28 by a user in the direction of the support member 16, thereby to actuate the valve 20 from its closed to its open condition. That is, when the top of a bottle 4 is placed into contact with a valve 20, and the bottom of a bottle 4 is urged upwardly along the inclined cam surface 28, the top of the bottle 4 serves to actuate the valve 20 from its closed condition to its open condition, thereby allowing treated water to flow from the water treatment reservoir 18 into the bottle 4, and allowing air entrapped in the bottle 4 to be released from the bottle 4 to the surrounding environment in the manner described above.

A protrusion 30 is provided on the inclined cam surface 28 to retain the bottle 4 in a generally vertical installed position when the bottle 4 has reached the desired location along the inclined cam surface 28. In its installed position, the bottle 4 is held snuggly between the base 14 and a corresponding valve 20, which is actuated to its open condition. The protrusion 30 serves to snap and lock the bottle 4 into place between the base 14 and an associated valve 20, and thereby provides the user with an indication as to when the bottle 4 has been properly installed in the device 2. Upon removal, the protrusion 30 serves to release the bottle 4 from the device 2, and thereby provides the user with an indication as to when the bottle 4 can be readily removed from the device 2.

The distance between the base 14 and each valve 20 is configured to closely match the height of the bottle 4. That is, the distance from the top of the base 14 and, more particularly, the distance from the protrusion 30, to the bottom of an associated valve 20 must be sufficient to allow the bottle 4 to fit between the base 14 and the associated valve 20, but is not so large that the bottle fails to actuate the valve 20 when the bottle 4 is placed in its installed condition. That is, the distance between the base 14 and the associated valve 20 must be short enough to ensure that the bottle 4 actuates the valve 20 upon reaching its installed position, but is not so short that the bottle does not fit securely between the base 14 and the valve 20. The distance between the protrusion 30 and the bottom of an associated valve 20 will depend on the height of the bottle 4. In a specific embodiment, the distance may be at least about 5 (12.7 cm) inches or at least about 6 inches (15.2 cm), and no greater than about 8 inches (20.3 cm), or no greater than about 7 inches (17.8 cm).

Figure 4:
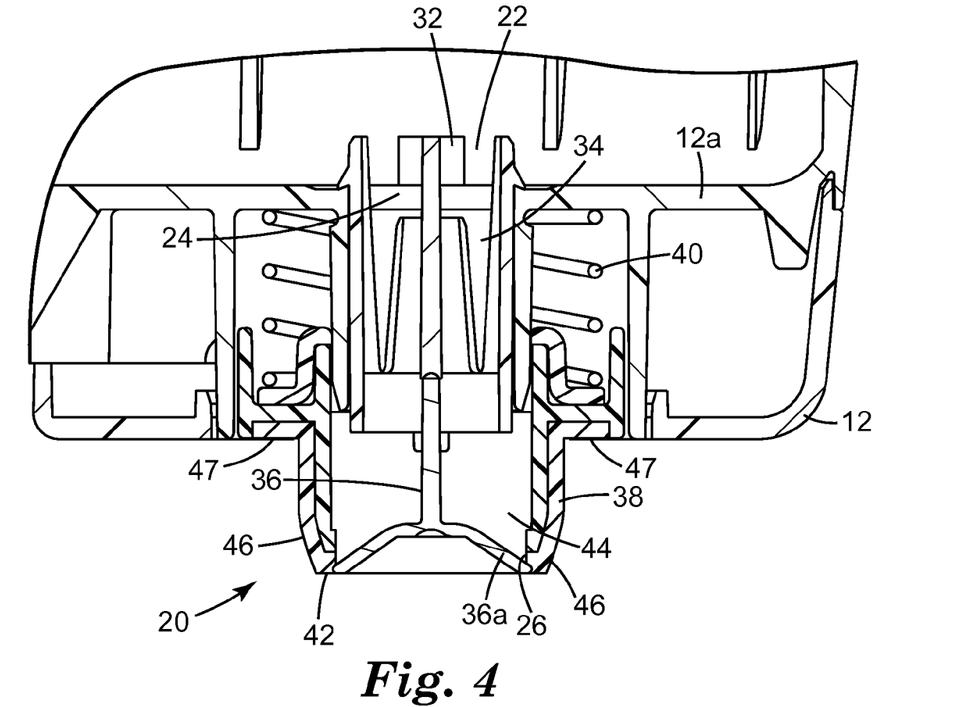
FIG. 4 is a detailed cross-sectional view of a valve.

Referring now to FIG. 4, there is shown a detailed view of a valve 20 in its non-actuated closed condition. The illustrated valve is intended to represent any of the valves 20. In the illustrated embodiment, the valve 20 includes at least one air flow passageway 32 and at least one water flow passageway 34. The air flow passageway 32 protrudes from the orifice 24 (i.e. beyond the plane defined by the top surface of the bottom wall 12a of the housing unit 12), thereby to promote the separate flow of air through the air flow passageway 32 and flow of water through the water flow passageway 34, respectively.

The valve 20 includes a valve member 36, a sleeve member 38 arranged around the valve member 36, and a biasing member 40 arranged to urge the sleeve member 38 downwardly into contact with the valve member 36. The valve member 36 extends downwardly from the housing unit 12 and includes a terminal end that defines a sealing portion 36a. The upper end of the valve member 36 (i.e. the end opposite the sealing portion 36a) is attached to the bottom wall 12a of the housing unit 12, and therefore remains in a fixed position relative to the housing unit 12. The sleeve member 38 is permitted to move repeatedly upwardly and downwardly along the axis of the valve member 36, thereby opening and closing the valve 20, respectively. In one embodiment, the distance the sleeve member 38 moves when it moves between its closed position and its fully actuated/retracted open position is at least about 2 millimeters (mm), at least about 3 mm, or at least about 4 mm, and no greater than about 20 mm, no greater than about 12 mm, and no greater than about 7 mm.

The lower end 42 of the sleeve member 38 contains the water exit/air inlet port 26, which leads to an internal flow channel 44 within the sleeve member 38. The sleeve member 38 includes a frustoconical outer surface 46 that extends from the exposed end 42 of the sleeve member 38 upwardly toward the housing unit 12, and includes an annular shoulder surface 47 that extends radially outwardly from the frustoconical surface 46 adjacent the housing unit 12. The outer diameter of the frustoconical surface 46 may vary from about 2 cm adjacent the exposed end 42 of the sleeve 38, to about 2.5 cm adjacent the shoulder surface 47. The shoulder surface 47 may have an inner diameter adjacent the frustoconical surface 46 of about 2.5 cm, and an outer diameter of about 3 cm. Depending on the specific geometry of the sleeve member 38, the surface 46 may encompass a portion of the inner surface that defines the flow channel 44. That is, the water exit/air inlet port 26 may be recessed, whereby the sealing portion 36a of the valve member 36 forms a seal with an inner surface of the sleeve member 38 leading to the flow channel 44.

The sleeve member 38 serves two functions. First, the sleeve member 38 serves to form a seal with the valve member 36, thereby to open and close the valve 20. Second, the sleeve member 38 serves to form a seal with the bottle 4, thereby allowing the bottle 4 to be filled without leaking or spilling. That is, the sleeve member 38, and more particularly, surfaces 46 and/or 47, form two seals: one with the valve member 36, and one with the opening of a bottle 4. The sealing portion 36a of the valve member 36 is arranged to selectively sealingly engage the sleeve member 38 in the vicinity of the water exit/air inlet port 26, thereby closing the water exit/air inlet port 26 and minimizing the amount of water that can spill from the valve 20 when the bottle 4 is removed from the device 2. Surfaces 46 and/or 47 provide a contact surface against which the opening in the top of a bottle may form a hermetic seal, thereby forming a closed system that prevents the bottle from overflowing during filling. That is, when a bottle 4 is filled with treated water, the seal created between the sleeve member 38 and the bottle 4 prevents water from overflowing from the top of the bottle 4, and the seal created between the sleeve member 38 and the sealing portion 36a of the valve member 36 prevents flow through and/or leakage from the valve 20 when the valve is closed.

In one embodiment, the outer surface 46,47 of the sleeve member 36 may comprise an elastomeric material that serves to facilitate the formation of an airtight and watertight seal with the sealing portion 36a of the valve member 36, and also form an airtight and watertight seal with the opening of the bottle 4.

In the illustrated embodiment, the biasing member 40 is a helical compression spring that normally exerts a force against the sleeve member 38 that urges the valve 20 to its non-actuated or closed condition. The valve 20 may be opened by exerting a force against the sleeve member 38 that overcomes the spring force. This may be accomplished, for example, by placing the top of a bottle 4 against the sleeve member 36, and manually forcing the bottle 4 upwardly to overcome the spring force, thereby actuating the valve 20 to its open condition.

Referring again to FIG. 2, in the illustrated embodiment, the device 2 includes an optional lid 9 arranged to enclose the reservoir 18. The device 2 may also include a drain valve 50 arranged in fluid communication with the reservoir 18. The drain valve 50 allows any water remaining in the reservoir 18 after the bottles 4 have been filled to be easily drained from reservoir 18.

Figure 5:
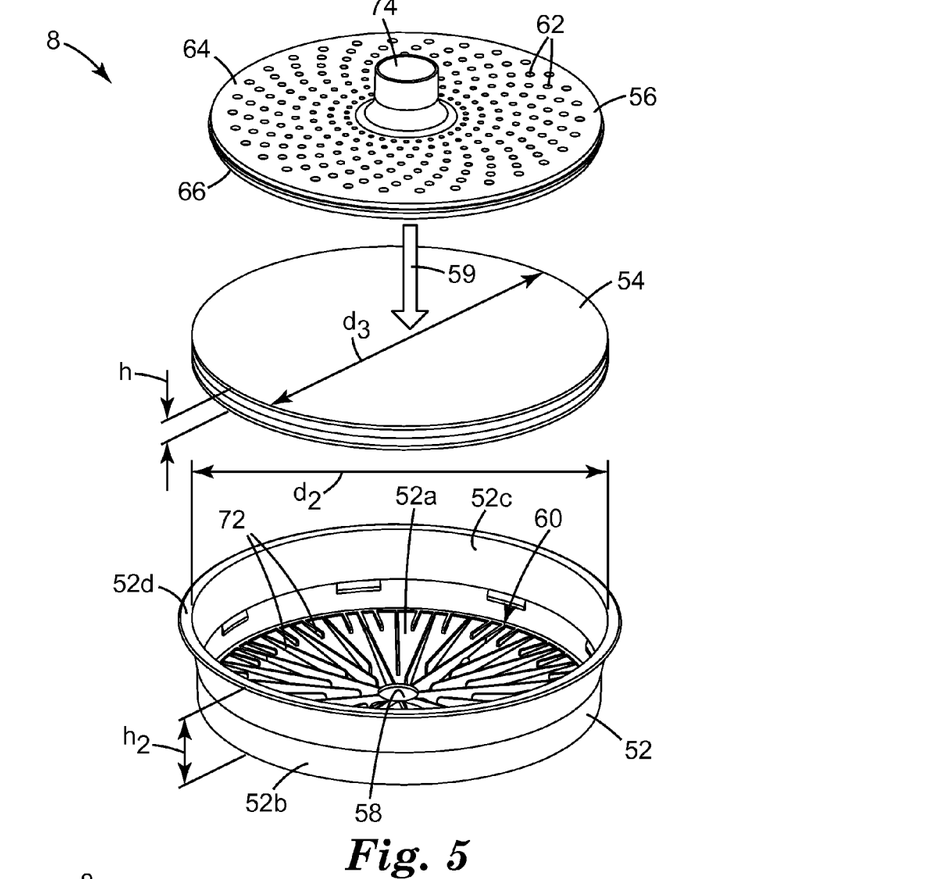
FIG. 5 is an exploded perspective view of a treatment cartridge.
Figure 6:
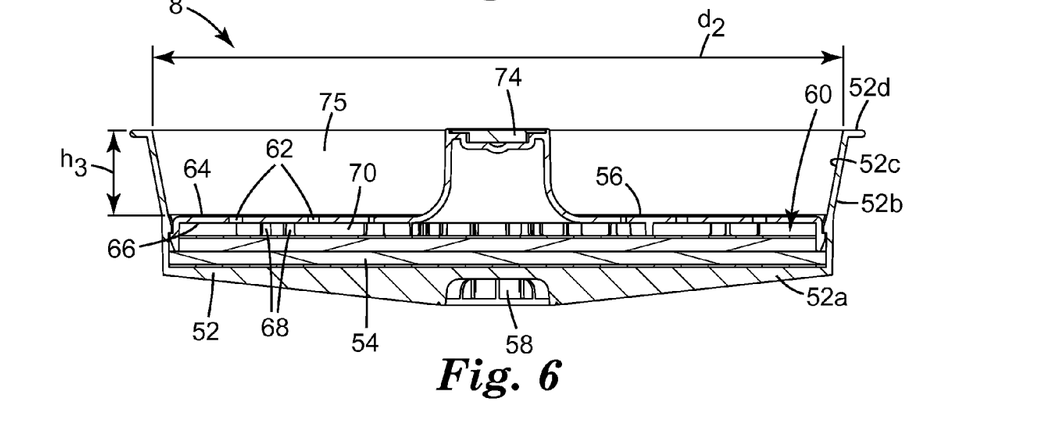
FIG. 6 is a cross-sectional view of a treatment cartridge.

Referring now to FIGS. 5 and 6, the illustrated treatment cartridge 8 includes a tray member 52, water treatment material 54 arranged within the tray member 52, and an optional water distribution plate 56 arranged in the tray member 52 adjacent the treatment material 54. The tray member 52 includes a circular bottom wall portion 52a containing at least one drain opening 58 arranged to allow treated water to exit the cartridge 8, and includes an annular side wall portion 52b that extends upwardly from the periphery of the bottom wall portion 52a. The water distribution plate 56 is arranged in the tray member 52 to define a water treatment chamber 60 between the tray member 52 and the water distribution plate 56 that contains the treatment material 54. The water distribution plate 56 contains a plurality of water distribution openings 62 that allow untreated water to pass through the water distribution plate 56 into the water treatment chamber 60.

In the illustrated embodiment, the tray member 52 is generally disc-shaped, and has a height "$h_2$" of no greater than about 4 cm, no greater than about 5 cm, or no greater than about 6 cm, an inner diameter "$d_2$" of at least about 4 cm, at least about 5 cm, or at least about 6 cm, and an inner diameter "$d_2$" of no greater than about 25 cm, no greater than 20 cm, or no greater than 18 cm. The tray member 52 may be provided in a wide variety of shapes and sizes depending on the size and shape of the housing assembly 6, the water treatment material 54, and the desired treatment characteristics of the device 2. Regardless of the particular configuration, the tray member 52 generally has a volume of less than about 1.5 liters, less than about 1.2 liters, and less than about 1 liter.

The optional water distribution plate 56 includes opposed upper 64 and lower 66 surfaces. The lower surface 66 includes a plurality of rib portions 68 for maintaining the water distribution plate 56 in spaced relation from the treatment material 54. The spaced region between the water distribution plate 56 and treatment material 54 defines a pre-water treatment manifold 70 that creates a region of generally uniform flow and pressure drop as the untreated water enters the treatment material 54.

In the illustrated embodiment, the bottom wall portion 52a of the tray member 52 is generally conical and slopes downwardly from the outer side wall portion 52b in the direction of the centrally located drain opening 58. That is, the bottom wall portion 52a is radially inclined from the drain opening 58 to the side wall portion 52b. Configured in this manner, treated water is directed to the drain opening 58 after it passes through the treatment material 54. In addition, air from the bottle 4 exiting a water inlet/air exit port 22 is directed radially upwardly and outwardly along the bottom surface of the bottom wall portion 52a. To further direct the flow of treated water, the upper surface of the bottom wall portion 52a includes a plurality of radially extending guide vanes 72 that direct the flow of treated water toward the drain opening 58.

The water distribution plate 56 may be readily separable from, or permanently affixed to, the tray member 52. That is, the water distribution plate 56 may be manually removable from the tray member 52 to allow for access to, and removal and/or replacement of, the treatment material 54, or the water distribution plate 56 and tray member 52 may be permanently joined to form a sealed enclosure for the water treatment material 54 that restricts access to the treatment material 54. When the distribution plate 56 and tray member 52 are joined to form a single unit enclosing the treatment material 54, the treatment material 54 may be replaced by replacing the entire cartridge 8. In the illustrated embodiment, the water distribution plate 56 is intended to be removable. In this manner, the treatment material 54 may be replaced, and the distribution plate 56 and tray member 52 may be reused.

In the illustrated embodiment, the cartridge 8 includes a handle 74 extending outwardly from the upper surface 64 of the water distribution plate 56. The handle 74 is provided to facilitate removal of the cartridge 8 from the housing assembly 6, or to facilitate separation of the distribution plate 56 from the tray member 52, thereby allowing the water treatment material 54 to be replaced.

In one aspect of the illustrated embodiment, when the water distribution plate 56 is installed in the tray member 52, a peripheral edge portion of the water treatment material 54 is pinched between the tray member 52 and the water distribution plate 56, thereby forming a seal that minimizes the bypass of untreated water around the water treatment material.

As shown in the illustrated embodiment, when the water distribution plate 56 is operationally positioned (i.e. fully seated) in the tray member 52, the tray member 52 includes a rim portion 52c that extends upwardly beyond the water distribution plate 56. In this manner, the rim portion 52c and water distribution plate 56 combine to form a pre-treatment collection zone 75 for the untreated water being directed into the treatment cartridge 8. The collection zone 75 may have a height "$h_3$" (FIG. 6) of less than about 4 cm, less than about 3 cm, or less than about 2 cm. The collection zone 75 may have a volume of less than about 1 liter, less than about 0.7 liters, or less than about 0.5 liters. In accordance with one aspect of the device 2, the ratio of the volume of the bottles 4 to the volume of the collection zone 75 is greater than about 1:1. That is, the storage capacity of the bottles 4 is greater than the volume of the collection zone 75. In other more specific embodiment, the ratio of the volume of the bottles 4 to the volume of the collection zone 75 may be at least about 3:1, at least about 5:1, or at least about 7:1.

The tray member 52 further includes an annular lip portion 52d that extends outwardly from the top edge of the tray member 52 for supporting the treatment cartridge 8 in the housing unit 12.

In the illustrated embodiment, the water distribution openings 62 are provided in a pattern such that the total cross sectional surface area of the water distribution openings 62 is greatest in a perimeter region of the water distribution plate 56. In addition, the size of each water distribution opening 62 increases in the direction away from the center of the distribution plate 56. The illustrated pattern is intended to increase the flow rate of untreated water through the distribution plate 56 in the peripheral region of the distribution plate 56, thereby promoting more uniform flow through the treatment material 54. That is, the open area allowing untreated water to pass through the distribution plate 56 increases radially outwardly. In this manner, the center region of the treatment material 54 sees a lower flow rate of untreated water, and the outer region sees a higher flow rate of untreated water, and because the drain opening 58 is centrally located, the water is exposed to a more uniform degree of treatment.

In accordance with a characterizing aspect of the treatment cartridge 8, the water treatment material 54 has a low profile. That is, the water treatment material 54 is relatively thin compared to its width. More specifically, the ratio of the width of the water treatment material 54 ("$d_3$" in FIG. 5) to the average height of the water treatment material ("h" in FIG. 5) is generally greater than about 1:1. That is, the water treatment material 54 is typically wider than it is high. Thus, by way of example, if the water treatment material 54 has an average height "h" of ½ inch (1.27 cm), the water treatment material 54 will typically have a width $d_3$ of at least about ½ inch (1.27 cm). In more specific embodiments, the ratio of the width to the average height of the water treatment material 54 may be at least about 5:1, at least about 10:1, or at least about 20:1. For water treatment material 54 having a circular or disc-like shape, as illustrated in FIG. 5, it will be recognized that the width $d_3$ of the water treatment material 54 is equal to the diameter of the water treatment material 54. It will also be recognized that the water treatment material 54 may be provided in a variety of shapes and sizes.

In another aspect, the ratio of the transverse cross-sectional area of the water treatment material 54 to the average thickness of the water treatment material 54 is at least about 5 inches (12.7 cm). In more specific embodiments, the ratio of the transverse cross-sectional area to the average thickness of the water treatment material 54 may be at least about 10 inches (25.4 cm), at least about 30 inches (76.2 cm), at least about 50 inches (127 cm), at least about 75 inches (191 cm), or at least about 100 inches (254 cm). The ratio of the transverse cross-sectional area to the average thickness of the water treatment material 54 may be no greater than about 300 inches (762 cm), no greater than about 250 inches (635 cm), or no greater than about 200 inches (508 cm). The transverse cross-sectional area of the water treatment material 54 is the area bounded by the perimeter of the water treatment material 54. The transverse cross-sectional area may also be thought of as the cross-sectional area defined by a plane arranged perpendicular to the direction of flow of water 59 (FIG. 5) through the water treatment material 54. In the case of water treatment material 54 having a circular or disc-like shape, as illustrated in FIG. 5, the transverse cross-sectional area of the water treatment material 54 is the area of a circle having a diameter defined by the width $d_3$ of the water treatment material 54. Thus, by way of example, if the water treatment material 54 has an average height of 0.5 cm and a diameter of 6 cm, the ratio of the transverse cross-sectional area to the average height of the water treatment material would be about 57 cm.

In one aspect, the water treatment material 54 may include at least one of woven, knitted, and non-woven material. In one embodiment, the treatment material includes carbon, such as activated carbon. Suitable water treatment materials include granular activated carbon available under the trade designation TOG-NDS 20×50 from Calgon Cargon Corporation, Pittsburgh, Pa., and activated carbon cloth available under the trade designation Zorflex ACC from Calgon Cargon Corporation, Pittsburgh, Pa. In a specific embodiment, the treatment material 54 has a thickness of less than about ¾ inch. The treatment material 54 may be disc-shaped, and may have a diameter of at least about 5 inches, and a diameter of no greater than about 7 inches.

In accordance with one aspect of one embodiment, the water treatment material 54 has a flow rate of at least about 0.5 gallons per minute (gpm), at least about 0.75 gpm, or at least about 1.0 gpm at ¾ inch of water pressure head. In another aspect, the water treatment material 54 passes NSF Standard 42 for free chlorine reduction for a capacity of at least about 40 gallons, at least about 70 gallons, and at least about 100 gallons.

In the illustrated embodiment, the water treatment cartridge 8 is removably arranged within the reservoir 18 of the housing unit 12. In a specific embodiment, the water treatment cartridge 8 is loosely arranged in the reservoir 18. In this manner the cartridge 8 may be manually removed from the housing unit 12 by a user, thereby allowing the user to readily replace the cartridge or the treatment material 54.

Figure 7:
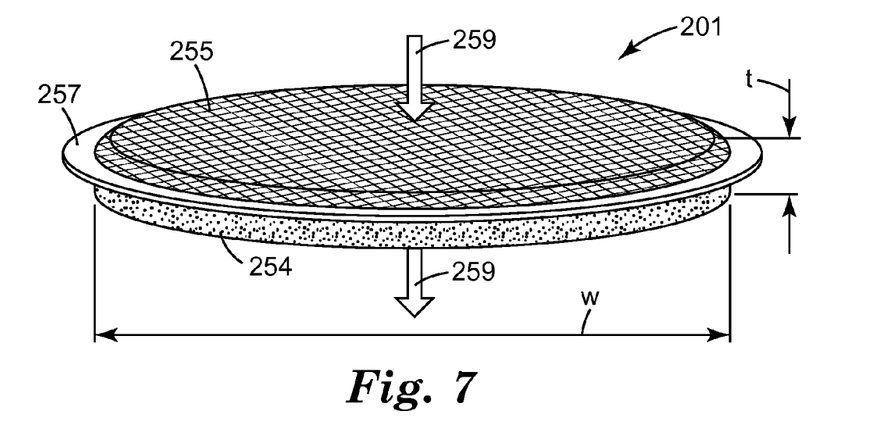
FIG. 7 is a perspective view of a water treatment insert.

Referring now to FIG. 7, there is shown a water treatment insert 201 comprising water treatment material 254 similar to the water treatment material 54, and a porous or open support structure 255 secured to the water treatment material 254. In the illustrated embodiment, the support structure 255 is secured to the upper surface of the water treatment material 254. In other embodiments, the support structure 255 may be arranged either within or on the lower surface of the water treatment material 254.

The water treatment insert 201 is configured for arrangement within the tray member 52 to treat water directed into the water treatment reservoir 18. The direction of flow of water through the water treatment insert 201 is indicated by reference numeral 259. The water treatment insert 201 may be used in conjunction with the water distribution plate 56, or without it. That is, the support structure 255 may take the place of the water distribution plate 56, therefore rendering the water distribution plate 56 unnecessary.

The support structure 255 may comprise, for example, a net, mesh, scrim or screen-like material, which may be formed of, for example, paper, metal, or synthetic plastic materials. Such materials are open and/or porous, thereby allowing water to pass through the water treatment insert 201. The support structure 255 may serve to distribute the untreated water so the untreated water flows more evenly and uniformly through the water treatment material 254. The support structure 255 also tends to enhance the durability of the water treatment insert 201.

In the illustrated embodiment, the water treatment insert 201 includes an optional annular gasket 257 that extends generally around the perimeter of the water treatment material 254. Provided in this manner, the gasket 257 forms a seal with the tray member 52 when the water treatment insert 201 is placed in the tray member 52, thereby minimizing the amount of untreated water that may bypass the water treatment material 254. If the water treatment insert 201 is provided with a gasket 257, the water treatment insert 201 is typically placed in the tray member 52 because the tray allows air from a bottle 4 to readily escape though a gap between the tray member 52 and the side wall 12b of the housing unit 12. If the gasket 257 is omitted, the water treatment insert 201 may be placed either in the tray member 52 or directly into the water treatment reservoir 18 of the housing unit 12. This is possible because—without the gasket 257—the water treatment insert 201 does not form a seal with the tray member 52 or the housing unit 12, and air from a bottle 4 is able to escape by flowing around and/or through the water treatment insert 201.

Figure 8A:
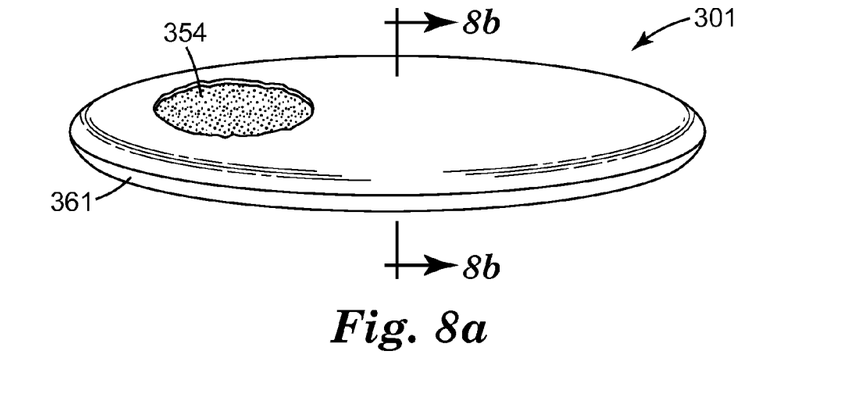
FIG. 8a is a perspective view of an alternate embodiment of a water treatment insert.
Figure 8B:
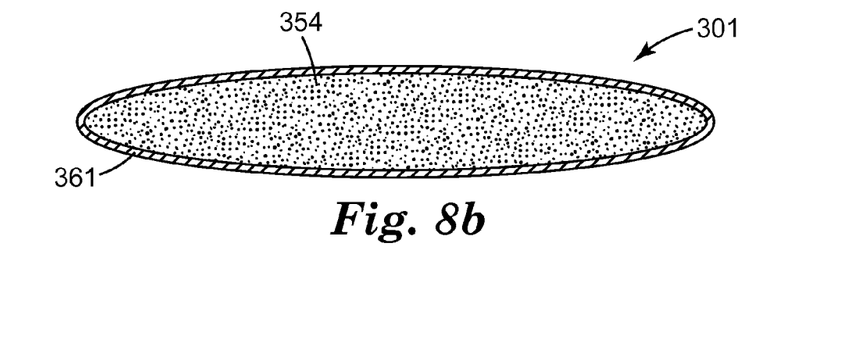

Referring now to FIGS. 8a and 8b, there is shown a water treatment insert 301 comprising water treatment material 354 enclosed within a pouch 361. The pouch 361 may be formed of an open net, mesh, scrim or screen-like material formed of, for example, metal or synthetic plastic materials, or it may be formed of a water permeable material such as a porous paper material. The illustrated water treatment insert 301 may be placed either directly in the housing unit 12 or in the tray member 52, and may be used either with or without the water distribution plate 56

Figure 9:
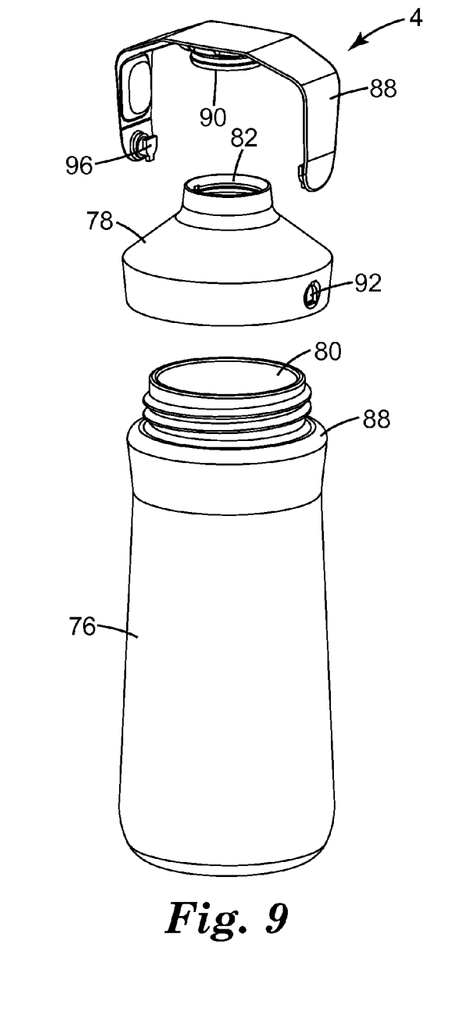
FIG. 9 is an exploded perspective view of a bottle.
Figure 10:
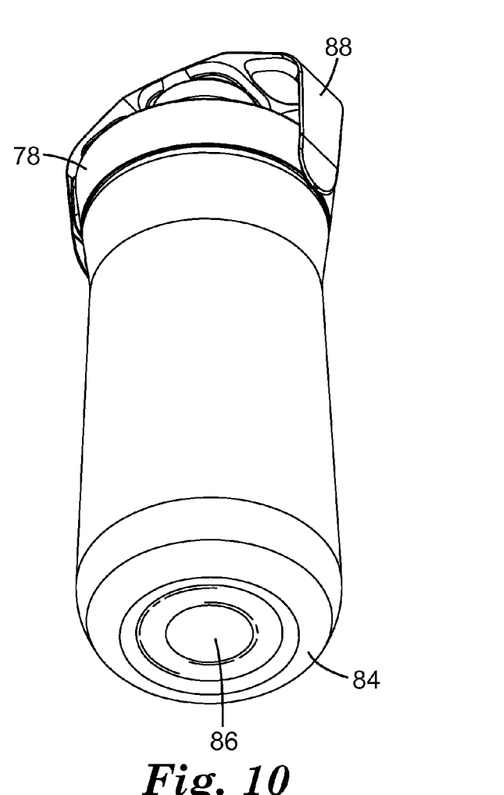
FIG. 10 is a bottom perspective view of a bottle.

Referring now to FIGS. 9 and 10, there is shown a bottle 4 which is intended to represent any of the bottles depicted in FIG. 2. Referring also to FIG. 3, the bottle 4 may be arranged to receive treated water dispensed from any one of the valves 20. Alternatively, a plurality of bottles 4 may be arranged in the device 2 to receive treated water dispensed from each of the valves 20 simultaneously.

In one desirable embodiment, the bottle 4 is configured so it can be arranged securely between one of the protrusions 30 located on the upper surface of the base 14 and one of the valves 20 that extends downwardly beneath the housing unit 12. More specifically, the bottle 4 is sufficiently tall so that it actuates the valve 20 when the top of the bottle is placed against a valve 20 and the bottle 4 is urged upwardly along the included cam surface 28, but is not so tall that the bottle 4 cannot be installed in a fully upright and vertical position between the protrusion 30 and an associated fully actuated valve 20. In one specific embodiment, the bottle has a height of at least about 6.5 inches, at least about 7.0 inches, or at least about 7.2 inches, and no greater than about 8.0 inches, no greater than about 7.7 inches, or no greater than about 7.5 inches. In another specific aspect, the bottle 4 is generally cylindrical, and has an outer diameter of no greater than about 6 inches, no greater than about 5 inches, or no greater than about 4 inches.

In the illustrated embodiment, the bottle 4 includes a containment vessel 76 and a cap 78 removably connected with the containment vessel 76. The cap 78 is threadably connected with the containment vessel 76. The containment vessel 76 contains a wide opening 80 that allows the interior of the containment vessel 76 to be readily accessed for cleaning, and the cap 78 contains a narrow opening or spout 82 configured to sealingly engage the sleeve member 38 of a valve 20, thereby to allow the bottle 4 to be filled, and to allow treated water to be poured out of the bottle 4.

In one embodiment, the narrow cap opening/spout 82 may have a diameter of at least about 0.87 inches, at least about 0.91 inches, or at least about 0.94 inches, and a diameter of no greater than about 1.06 inches, no greater than about 1.01 inches, or no greater than about 0.98 inches. In one embodiment, the bottle 4 has a volume of at least about 0.25 liters, at least about 0.5 liters, or at least about 0.75 liters, and has a volume of no greater than about 1.75 liters, no greater than about 1.5 liters, or no greater than about 1.25 liters.

In one aspect, the device 2 has a storage capacity of untreated water that is less than the storage capacity of the device for treated water. That is, the device 2 has a larger holding capacity for treated water than untreated water. The storage capacity of treated water may be 1.5 times greater than the storage capacity of untreated water, 2 times greater, or 2.5 times greater. The storage capacity of untreated water may be, for example, the volume of the tray member 52 before the water enters the water treatment material 54, and the storage capacity of treated water may be the combined volume of the bottles 4. In one aspect, the storage capacity of untreated water may be the volume of the pre-water treatment manifold 70 combined with the volume of the pre-treatment collection zone 75.

In the illustrated embodiment, the bottle 4 includes a bottom surface 84 having a detent 86 that mates with one of the protrusions 30 on the inclined cam surface 28 of the base 14, whereby the bottle 4 snaps into place when the detent 86 reaches the protrusion 30. In this manner, the detent 86 and protrusion 30 provide the user with an indication as to when the bottle 4 is properly installed in the device 2. When the bottle 4 is installed properly, it is held snuggly between the protrusion 30 and an associated valve 20 in an upright position, and the valve 20 is actuated open.

In the illustrated embodiment, the bottle 4 includes a flexible strap 88 that includes a stopper 90 configured to fit into, and thereby repeatedly open and close, the spout 82. The strap 88 is pivotally connected with the bottle 4 to allow the strap 88 to be selectively moved between a first position in which it does not interfere with access to the spout 82, and a second position in which the stopper 90 may be inserted and removed from the spout 82.

In the illustrated embodiment, the strap 88 is removably connected with the bottle 4 via a pair of asymmetric keyways 92 contained in opposite sides of the cap 78, and a pair of matching projections 96 that extend inwardly from the ends of the strap 88. In order for the strap 88 to be connected with the cap 78, the projections 96 must be aligned with the keyways 92. Because of the asymmetry of the keyways 92 and the projections 96, this can only be accomplished by positioning the strap 88 upside down so the stopper 90 is arranged directly under the cap 78 (i.e. opposite the spout 82). Arranged in this manner, the projections 96 may be inserted into the keyways 92, thereby allowing the strap 88 to be connected with the cap 78. To keep the strap 88 connected to the cap 78 (i.e. to prevent the projections 96 from coming out of the keyways 92) the strap 88 is rotated. Once the strap 88 is rotated, the projections 96 become locked into the keyways 92. Thus, the strap 88 can only be attached to, or removed from, the cap 78 when the projections 96 are properly oriented to fit into the keyways 92, and this can only be accomplished when the strap 88 is rotated and positioned directly beneath the cap 78. Thus, when the cap 78 is secured to a containment vessel 76, and the containment vessel 76 occupies the space directly below the cap 78, the strap 88 cannot be removed from the cap 78. That is, the containment vessel 76 prevents the strap 88 from being rotated to the position that allows the strap 88 to be separated from the cap 78.

Other ways of removably attaching the strap to the cap are also contemplated. For example, the cap may include elongated keyway channels that slidably mate with the keys on the strap, whereby the ends of the keyway channels are blocked by the containment vessel when the cap is secured to the containment vessel, thereby retaining the keys in the channel. As such, the strap may only be connected with, or removed from, the bottle when the cap is removed from the containment vessel.

Figure 11A:
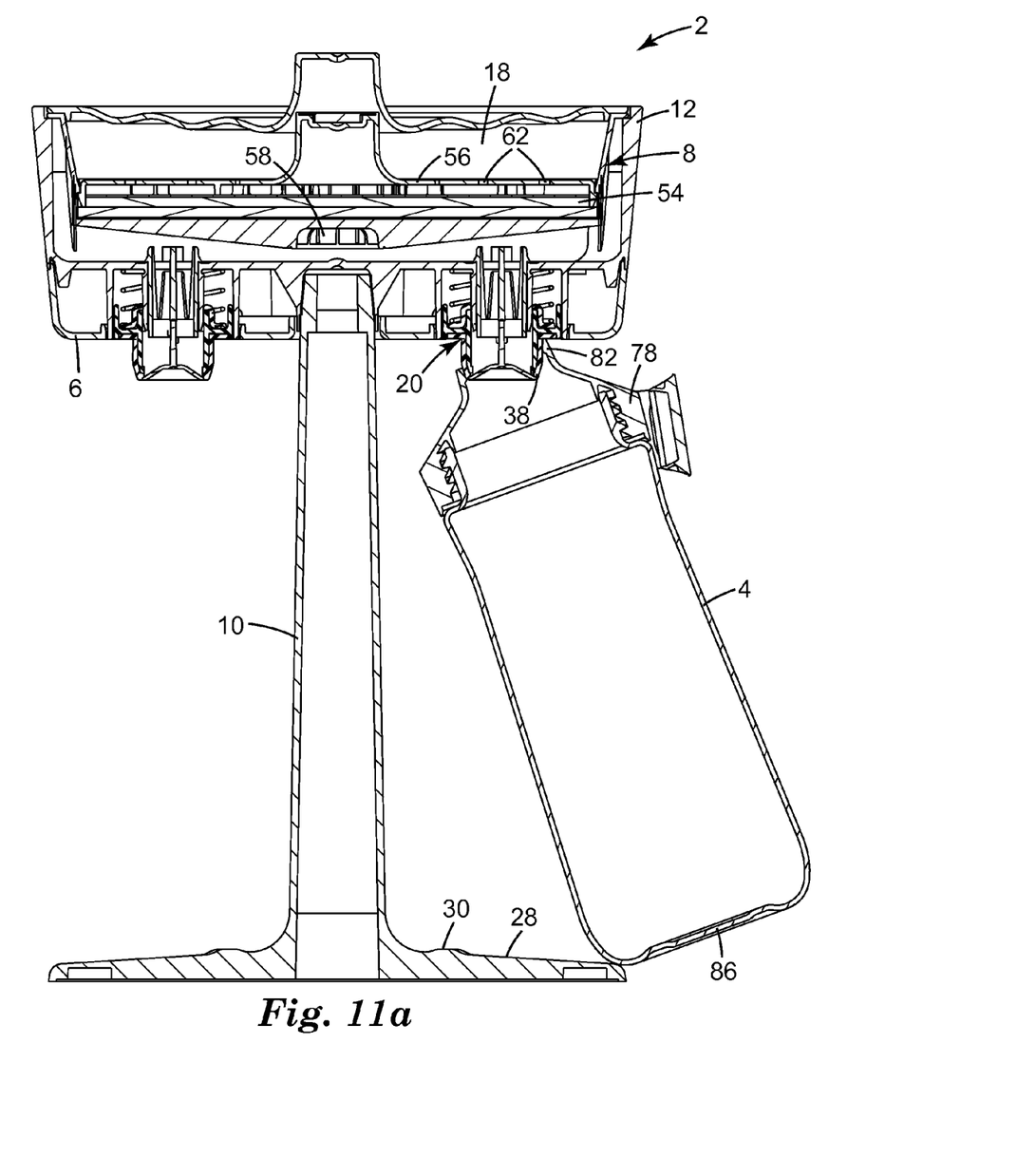
FIGS. 11a-c are cross-sectional views showing the filling sequence of a bottle.
Figure 11B:
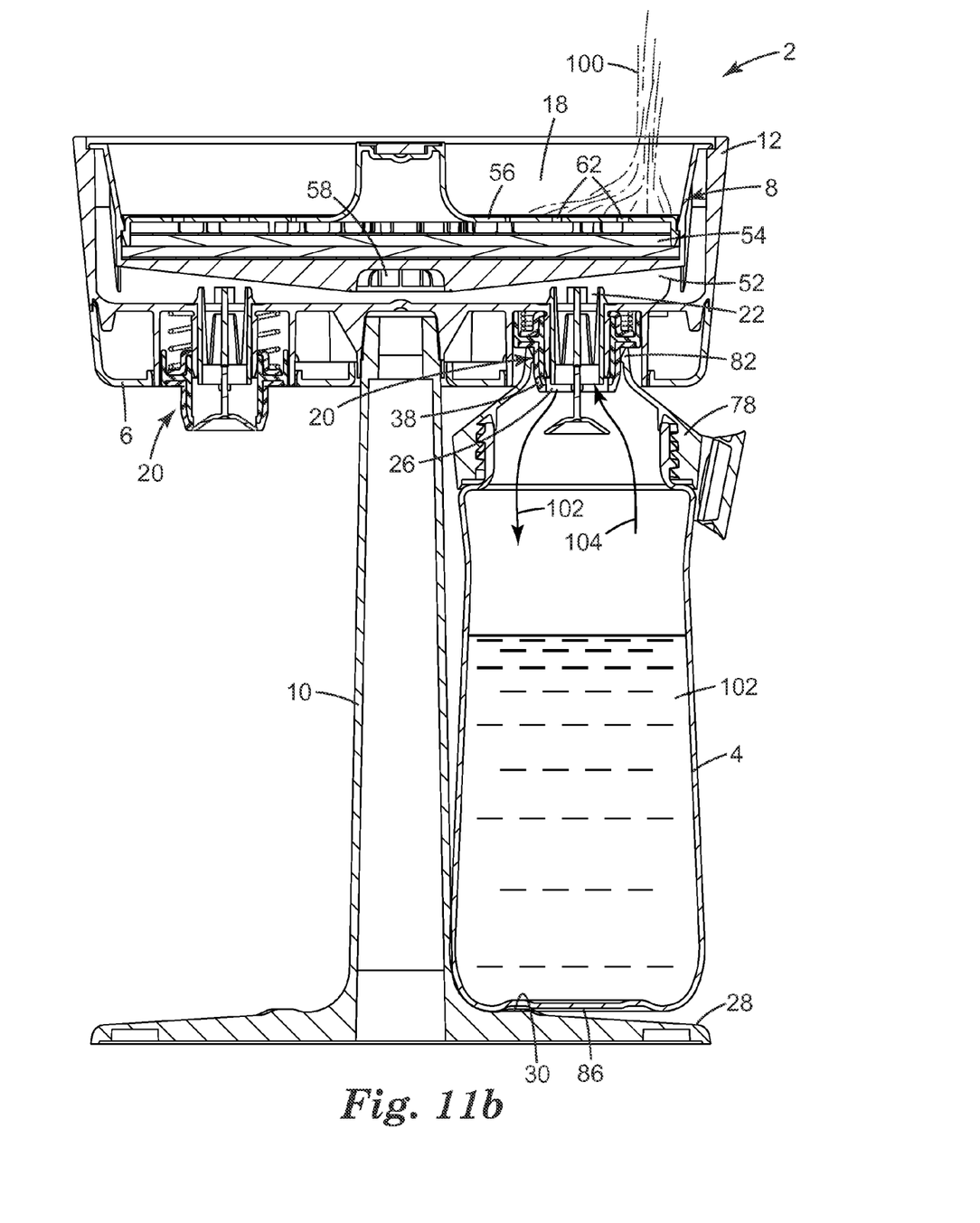
Figure 11C:
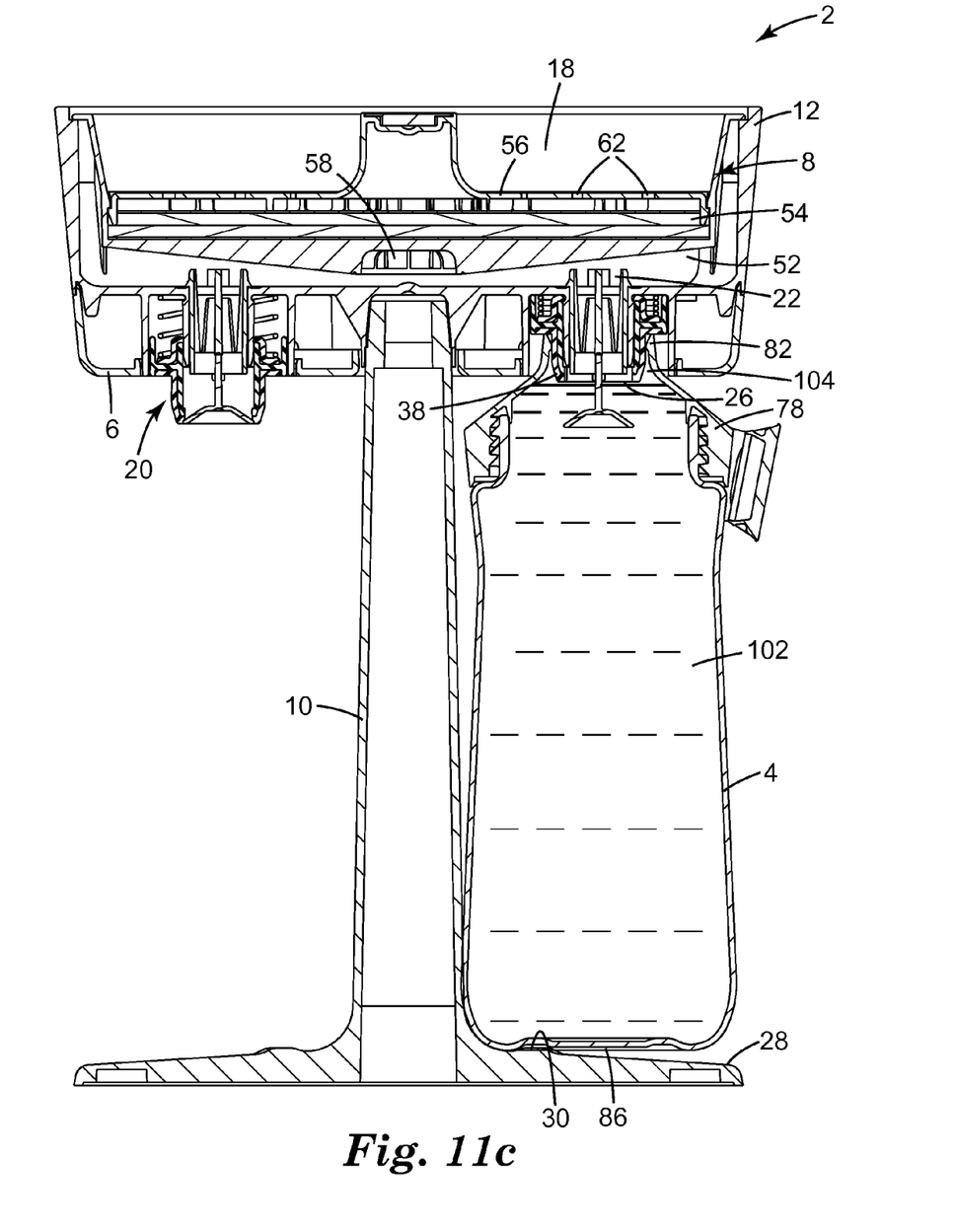

Referring now to FIGS. 11a-c, the operation of the device 2 is demonstrated. FIG. 11a shows the device in standby mode with one bottle 4 about to be installed in the device 2. Each of the valves 20 is closed so that no water can pass through the valves 20. The bottle 4 is tilted at an angle so the spout 82 is arranged around the sleeve member 38. The bottom of the bottle 4 is then slid upwardly along the inclined surface 28 until the detent 86 in the bottom of the bottle 4 locks into place on the protrusion 30. As this occurs, the sleeve member 38 is urged upwardly by the bottle 4 to open the valve 20, and the spout 82 of the cap 78 forms a seal with the sleeve member 38. The bottle 4 is now installed in the device 2.

Once at least one bottle 4 has been installed in the device 2, untreated tap water 100 may be poured into the reservoir 18 as illustrated in FIG. 11b. This may be accomplished, for example, by placing the device 2 directly under a faucet or otherwise directing the flow of tap water into the reservoir 18. The untreated water 100 then flows through the water distribution openings 62 in the water distribution plate 56, through the water treatment material 54, and out the drain opening 58 located in the bottom of the treatment cartridge 8. Treated water 102 then flows through a water inlet/air exit port 22, through a valve 20, through a water exit/air inlet port 26, and into the bottle 4. Because the bottle 4 and sleeve member 38 are hermetically sealed, the only way for air 104 trapped in the bottle to escape is to flow upwardly through the water exit/air inlet port 26, through a valve 20, and out the water inlet/air exit port 22. From here, the exhausted air flows upwardly and outwardly along the bottom surface 52a of the tray member 52, and then upwardly along the sides 52b of the tray member 52 until it exits the top of the device 2.

Referring now to FIG. 11c, once the bottle 4 is filled with treated water 102, the flow of treated water into the bottle 4 automatically stops. This happens when the water level in the bottle 4 reaches the bottom of the sleeve member 38. When full, the bottle 4 contains a small volume of trapped air 104 between the top of the water and the sleeve member 38. The full bottle 4 may then be removed by pulling outwardly on the bottom of the bottle 4 until the bottle 4 is released from the protrusion 30, thereby allowing the bottle 4 to pivot outwardly as the bottom of the bottle 4 slides down the inclined surface 28. As this occurs, the sleeve member 38 slides downwardly, thereby closing the valve 20. With the valve 20 now closed, any water remaining in the valve 20 is prevented from draining out as the bottle 4 is removed from the device 2. The treated water 102 may then be consumed immediately, or the stopper 90 may be placed in the spout 82 to close the bottle 4 so the treated water 102 may be stored and/or transported for later use.

The bottles 4, housing assembly 6, and treatment cartridge 8 may be constructed from any materials suitable for use in treating, dispensing, or containing of potable liquids. The bottles 4, housing assembly 6, and treatment cartridge 8 may be constructed using materials that are light-weight to facilitate portability of the device 2. Suitable materials include, for example, synthetic plastic materials such as thermoplastic polymer materials typically used for liquid containers. Suitable thermoplastic polymer materials may include polyethylene terephthalate (PET), polycarbonates, polypropylene, and the like. In a specific embodiment, the thermoplastic polymer material may be transparent and have sufficient strength to withstand sanitizing for enabling its reuse. Other suitable materials, such as thermosetting plastics, composite materials, metals, and combinations thereof may also be used. Glass and glass-like materials, ceramic materials, metals, and metal alloys may also be used in the construction of the bottles 4, housing assembly 6, and/or treatment cartridge 8.

Persons of ordinary skill in the art may appreciate that various changes and modifications may be made to the invention described above without deviating from the inventive concept. Thus, the scope of the present invention should not be limited to the structures described in this application, but only by the structures described by the language of the claims and the equivalents of those structures.

What is claimed is:

1. A water treatment device for filling at least one bottle with treated tap water, the device comprising:
   (a) a generally cylindrical shaped housing unit having a reservoir, wherein the housing unit comprises a stand, and the stand includes a base portion and a support portion extending from the base portion to the bottom of the housing unit; and
   (b) at least three valves arranged circumferentially about a central axis of the housing unit and in fluid communication with the reservoir, each valve having a water inlet/air exit port arranged adjacent to and defining an orifice in a bottom wall of the housing unit, and a water exit/air inlet port arranged opposite the water inlet/air exit port, whereby when the valve is actuated to its open condition, water is able to flow through the valve and into the bottle, and air entrapped in the bottle is able to flow through the valve and into the surrounding environment, and when the valve is in its closed condition, air and water are not able to flow through the valve
   wherein the bottle is configured to actuate the valve to its open condition when the top of the bottle engages the valve and the bottom of the bottle engages the base portion of the stand, and wherein the base portion includes an inclined surface angled upwardly in the direction of the support portion, whereby when the top of a bottle is placed into contact with a valve and the bottom of the bottle is urged upwardly along the inclined surface, the top of the bottle serves to actuate the valve from its closed condition to its open condition, thereby allowing treated water to flow into the bottle, and allowing air entrapped in the bottle to be released.

2. A device as defined in claim 1, wherein the inclined surface includes a protrusion arranged to retain a bottle in an installed position between the base portion and a corresponding valve actuated to its open condition.

3. A water treatment device for filling at least one bottle with treated tap water, the device comprising:
   (a) a housing unit having a reservoir;
   (b) at least one valve arranged in fluid communication with the reservoir, the valve having a water inlet/air exit port arranged adjacent to the housing unit, and a water exit/air inlet port arranged opposite the water inlet/air exit port, whereby when the valve is actuated to its open condition, water is able to flow through the valve and into the bottle, and air entrapped in the bottle is able to flow through the valve and into the surrounding environment, and when the valve is in its closed condition, air and water are not able to flow through the valve;
   wherein the housing unit further comprises a stand including a base portion and a support portion extending from the base to the bottom of the housing unit;
   wherein the bottle is configured to actuate the valve to its open condition when the top of the bottle engages the valve and the bottom of the bottle engages the base portion of the stand;
   wherein the base includes an inclined surface angled upwardly in the direction of the support portion, whereby when the top of a bottle is placed into contact with a valve and the bottom of the bottle is urged upwardly along the inclined surface, the top of the bottle serves to actuate the valve from its closed condition to its open condition, thereby allowing treated water to flow into the bottle, and allowing air entrapped in the bottle to be released;
   wherein the inclined surface includes a protrusion arranged to retain a bottle in an installed position between the base portion and a corresponding valve actuated to its open condition;

(c) a valve member extending downwardly from the housing unit, the valve member including a sealing portion;
(d) a sleeve member arranged around the valve member and movable to engage the valve member, the sleeve member containing a flow channel; and
(e) a biasing member arranged to urge the sleeve member into contact with the valve member.

4. A device as defined in claim 3, wherein the valve member remains in a generally fixed position relative to the housing unit, and the sleeve member is slidably arranged around the valve member.

5. A device as defined in claim 4, wherein the sleeve member includes a first end opposite the biasing member containing the water exit/air inlet port, and further wherein the sleeve member includes an outer sealing surface extending from the water exit/air inlet port toward the housing unit, and further wherein the sealing portion of the valve member is arranged to selectively shut the water exit/air inlet port.

6. A device as defined in claim 5, wherein the outer sealing surface includes a frustoconical surface and a radially outwardly extending shoulder surface.

7. A device as defined in claim 6, wherein the valve is movable between a non-actuated closed condition and an actuated open condition, and further wherein the valve is actuated to its open condition when a bottle is properly installed in the device.

8. A device as defined in claim 7, wherein the sealing surface forms a hermetic seal with an opening of the bottle, thereby forming a closed system that prevents overflow of water from the bottle during filling and minimizes spillage of water from the valve when the bottle is removed from the device.

\* \* \* \* \*